US011722278B2

United States Patent
Khoshnevisan et al.

(10) Patent No.: US 11,722,278 B2
(45) Date of Patent: Aug. 8, 2023

(54) QUASI-COLOCATION INDICATION AFTER DOWNLINK TRANSMISSION

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US); Peter Gaal, San Diego, CA (US); Le Liu, Fremont, CA (US); Wanshi Chen, San Diego, CA (US); Alberto Rico Alvarino, San Diego, CA (US); Juan Montojo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 135 days.

(21) Appl. No.: 17/208,349

(22) Filed: Mar. 22, 2021

(65) Prior Publication Data

US 2021/0306125 A1  Sep. 30, 2021

Related U.S. Application Data

(60) Provisional application No. 63/003,217, filed on Mar. 31, 2020.

(51) Int. Cl.
*H04L 5/00* (2006.01)
*H04W 74/08* (2009.01)
(Continued)

(52) U.S. Cl.
CPC ....... *H04L 5/0053* (2013.01); *H04W 72/0446* (2013.01); *H04W 72/23* (2023.01); *H04W 74/0816* (2013.01)

(58) Field of Classification Search
CPC ... H04L 5/0053; H04L 5/0044; H04L 5/0035; H04L 5/0094; H04L 5/001;
(Continued)

(56) References Cited

U.S. PATENT DOCUMENTS

2019/0229852 A1 7/2019 Li et al.
2019/0373636 A1 12/2019 Yerramalli et al.
(Continued)

FOREIGN PATENT DOCUMENTS

WO  WO-2018217063 A1  11/2018

OTHER PUBLICATIONS

International Search Report and Written Opinion—PCT/US2021/023585—ISA/EPO—dated Jun. 15, 2021 (203386WO).

*Primary Examiner* — Dady Chery
(74) *Attorney, Agent, or Firm* — Norton Rose Fulbright US LLP; Dang M. Vo

(57) ABSTRACT

Quasi-colocation (QCL) indication is discussed after downlink transmission. In the management of multiple transmission-reception point (TRP) downlink transmissions, a second indication of a QCL assumption for a particular downlink transmission may be transmitted to receiving user equipment (UEs) after transmission of the downlink transmission. Once a TRP passes a listen before talk (LBT) procedure in a first time interval, it may send a first downlink control information (DCI) with indication of a first QCL assumption for the transmission in the first time interval. The TRP then transmits the downlink transmission intended for part of the multi-TRP downlink transmission. Upon receiving an indication that another of the TRPs was unsuccessful in its part of the multi-TRP transmission, the TRP may transmit a second DCI in a subsequent time interval with
(Continued)

adjustments to the QCL assumption for the UEs to use in processing the downlink transmission from the first time interval.

30 Claims, 10 Drawing Sheets

(51) Int. Cl.
*H04W 72/0446* (2023.01)
*H04W 72/23* (2023.01)

(58) Field of Classification Search
CPC ........... H04W 72/042; H04W 72/0446; H04W 74/0816; H04W 72/1273
See application file for complete search history.

(56) References Cited

U.S. PATENT DOCUMENTS

2022/0095350 A1* 3/2022 Lee .................... H04W 72/042
2022/0216964 A1* 7/2022 Mondal ................ H04J 11/0053

* cited by examiner

QUASI-COLOCATION INDICATION AFTER DOWNLINK TRANSMISSION

CROSS-REFERENCE TO RELATED APPLICATIONS

This application claims the benefit of U.S. Provisional Patent Application No. 63/003,217, entitled, "QUASI-CO-LOCATION INDICATION AFTER DOWNLINK TRANSMISSION," filed on Mar. 31, 2020, which is expressly incorporated by reference herein in its entirety.

BACKGROUND

Field

Aspects of the present disclosure relate generally to wireless communication systems, and more particularly, to quasi-colocation (QCL) indication after downlink transmission.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, by a user equipment (UE), a first downlink control information (DCI) including one or more transmission configuration indicator (TCI) states, wherein the one or more TCI states are associated with a scheduled multi-transmission-reception points (TRP) downlink transmission in a first time interval, monitoring, by the UE, for a second DCI in a subsequent time interval, wherein the second DCI includes an adjustment to the one or more TCI states of the first DCI, and in response to detection of the second DCI, processing, by the UE, the scheduled multi-TRP downlink transmission in the subsequent time interval according to a second quasi-colocation (QCL) assumption corresponding to the adjustment to the one or more TCI states.

In an additional aspect of the disclosure, a method of wireless communication includes transmitting, by a TRP in response to a successful listen before talk (LBT) procedure, a first DCI including one or more TCI states for a multi-TRP downlink transmission coordinated with one or more neighboring TRPs via shared communication spectrum, transmitting, by the TRP, a downlink transmission to one or more UEs in a first time interval in response to the successful LBT procedure on the shared communication spectrum, wherein the downlink transmission is intended for the multi-TRP downlink transmission, obtaining, by the TRP, an indication that at least one TRP of the one or more neighboring TRPs failed to successfully complete the multi-TRP downlink transmission during the first time interval, and transmitting, by the TRP, a second DCI in a subsequent time interval in response to the indication, wherein the second DCI includes an adjustment for the one or more TCI states reflecting a QCL assumption corresponding to the downlink transmission.

In an additional aspect of the disclosure, a method of wireless communication includes obtaining, by a TRP, coordination signaling for a multi-TRP downlink transmission during a first time interval with one or more neighboring TRPs over a shared communication spectrum, encountering, by the TRP, an event that indicates an unsuccessful multi-TRP downlink transmission by the TRP, and signaling, by the TRP, the unsuccessful multi-TRP downlink transmission by the TRP to the one or more neighboring TRPs.

In an additional aspect of the disclosure, an apparatus configured for wireless communication includes means for receiving, by a UE, a first DCI including one or more TCI states, wherein the one or more TCI states are associated with a scheduled multi-TRP downlink transmission in a first time interval, means for monitoring, by the UE, for a second DCI in a subsequent time interval, wherein the second DCI includes an adjustment to the one or more TCI states of the first DCI, and means, executable in response to detection of the second DCI, for processing, by the UE, the scheduled multi-TRP downlink transmission in the subsequent time interval according to a second QCL assumption corresponding to the adjustment to the one or more TCI states.

In an additional aspect of the disclosure, an apparatus configured for wireless communication includes means for transmitting, by a TRP in response to a successful LBT procedure, a first DCI including one or more TCI states for a multi-TRP downlink transmission coordinated with one or more neighboring TRPs via shared communication spectrum, means for transmitting, by the TRP, a downlink transmission to one or more UEs in a first time interval in response to the successful LBT procedure on the shared communication spectrum, wherein the downlink transmission is intended for the multi-TRP downlink transmission, means for obtaining, by the TRP, an indication that at least one TRP of the one or more neighboring TRPs failed to successfully complete the multi-TRP downlink transmission during the first time interval, and means for transmitting, by the TRP, a second DCI in a subsequent time interval in response to the indication, wherein the second DCI includes an adjustment for the one or more TCI states reflecting a QCL assumption corresponding to the downlink transmission.

In an additional aspect of the disclosure, an apparatus configured for wireless communication includes means for obtaining, by a TRP, coordination signaling for a multi-TRP downlink transmission during a first time interval with one or more neighboring TRPs over a shared communication spectrum, means for detecting, by the TRP, an event that indicates an unsuccessful multi-TRP downlink transmission by the TRP, and means for signaling, by the TRP, the unsuccessful multi-TRP downlink transmission by the TRP to the one or more neighboring TRPs.

In an additional aspect of the disclosure, a non-transitory computer-readable medium having program code recorded thereon. The program code further includes code to receive, by a UE, a first DCI including one or more TCI states, wherein the one or more TCI states are associated with a scheduled multi-TRP downlink transmission in a first time interval, code to monitor, by the UE, for a second DCI in a subsequent time interval, wherein the second DCI includes an adjustment to the one or more TCI states of the first DCI, and code, executable in response to detection of the second DCI, to process, by the UE, the scheduled multi-TRP downlink transmission in the subsequent time interval according to a second QCL assumption corresponding to the adjustment to the one or more TCI states.

In an additional aspect of the disclosure, a non-transitory computer-readable medium having program code recorded thereon. The program code further includes code to transmit, by a TRP in response to a successful LBT procedure, a first DCI including one or more TCI states for a multi-TRP downlink transmission coordinated with one or more neighboring TRPs via shared communication spectrum, code to transmit, by the TRP, a downlink transmission to one or more UEs in a first time interval in response to the successful LBT procedure on the shared communication spectrum, wherein the downlink transmission is intended for the multi-TRP downlink transmission, code to obtain, by the TRP, an indication that at least one TRP of the one or more neighboring TRPs failed to successfully complete the multi-TRP downlink transmission during the first time interval, and code to transmit, by the TRP, a second DCI in a subsequent time interval in response to the indication, wherein the second DCI includes an adjustment for the one or more TCI states reflecting a QCL assumption corresponding to the downlink transmission.

In an additional aspect of the disclosure, a non-transitory computer-readable medium having program code recorded thereon. The program code further includes code to obtain, by a TRP, coordination signaling for a multi-TRP downlink transmission during a first time interval with one or more neighboring TRPs over a shared communication spectrum, code to detect, by the TRP, an event that indicates an unsuccessful multi-TRP downlink transmission by the TRP, and code to signal, by the TRP, the unsuccessful multi-TRP downlink transmission by the TRP to the one or more neighboring TRPs.

In an additional aspect of the disclosure, an apparatus configured for wireless communication is disclosed. The apparatus includes at least one processor, and a memory coupled to the processor. The processor is configured to receive, by a UE, a first DCI including one or more TCI states, wherein the one or more TCI states are associated with a scheduled multi-TRP downlink transmission in a first time interval, to monitor, by the UE, for a second DCI in a subsequent time interval, wherein the second DCI includes an adjustment to the one or more TCI states of the first DCI, and to process, by the UE, in response to detection of the second DCI, the scheduled multi-TRP downlink transmission in the subsequent time interval according to a second QCL assumption corresponding to the adjustment to the one or more TCI states.

In an additional aspect of the disclosure, an apparatus configured for wireless communication is disclosed. The apparatus includes at least one processor, and a memory coupled to the processor. The processor is configured to transmit, by a TRP in response to a successful LBT procedure, a first DCI including one or more TCI states for a multi-TRP downlink transmission coordinated with one or more neighboring TRPs via shared communication spectrum, to transmit, by the TRP, a downlink transmission to one or more UEs in a first time interval in response to the successful LBT procedure on the shared communication spectrum, wherein the downlink transmission is intended for the multi-TRP downlink transmission, to obtain, by the TRP, an indication that at least one TRP of the one or more neighboring TRPs failed to successfully complete the multi-TRP downlink transmission during the first time interval, and to transmit, by the TRP, a second DCI in a subsequent time interval in response to the indication, wherein the second DCI includes an adjustment for the one or more TCI states reflecting a QCL assumption corresponding to the downlink transmission.

In an additional aspect of the disclosure, an apparatus configured for wireless communication is disclosed. The apparatus includes at least one processor, and a memory coupled to the processor. The processor is configured to obtain, by a TRP, coordination signaling for a multi-TRP downlink transmission during a first time interval with one or more neighboring TRPs over a shared communication spectrum, to detect, by the TRP, an event that indicates an unsuccessful multi-TRP downlink transmission by the TRP, and to signal, by the TRP, the unsuccessful multi-TRP downlink transmission by the TRP to the one or more neighboring TRPs.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
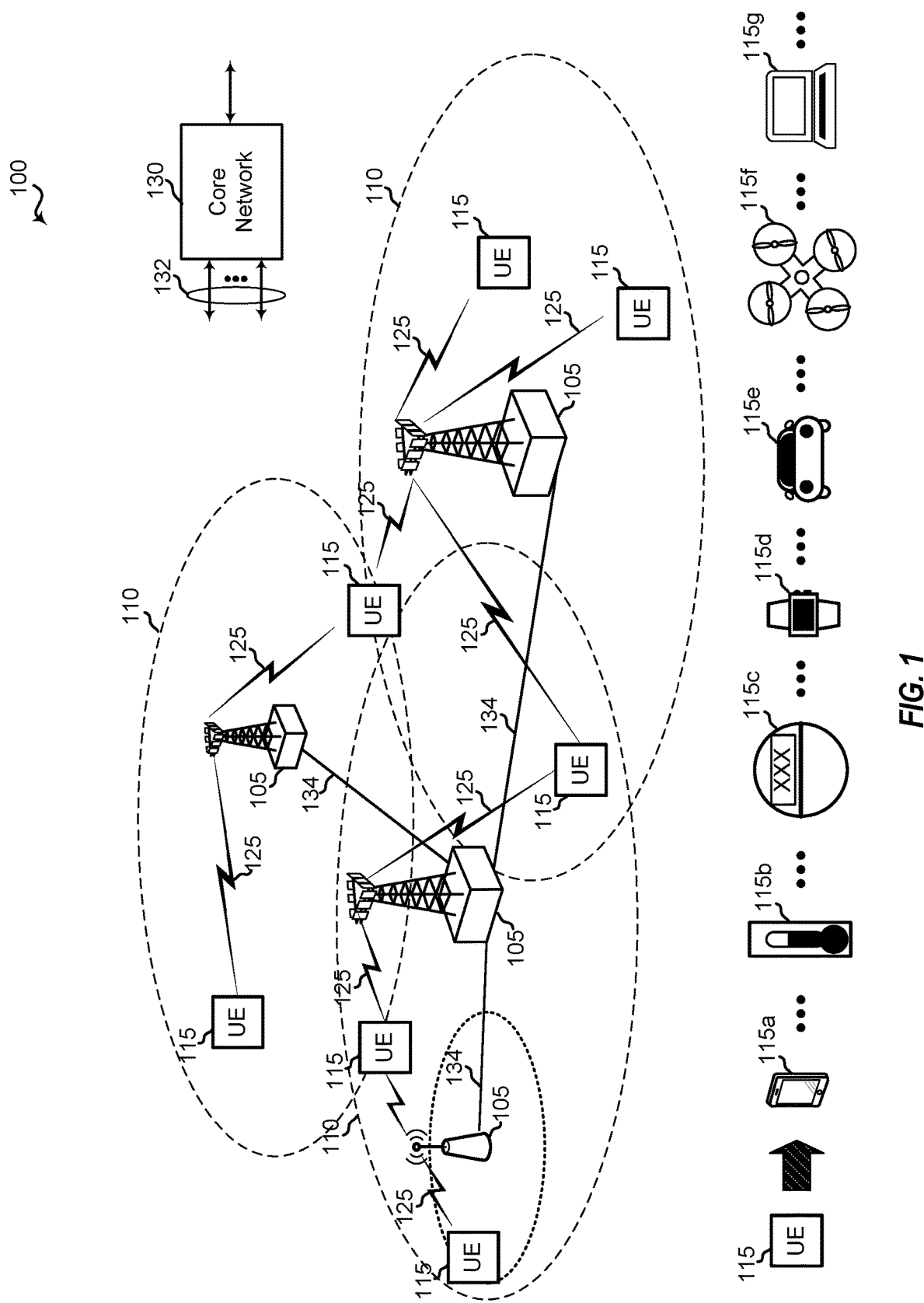
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports providing a quasi-colocation (QCL) assumption indication for a multiple transmission-reception point (TRP) downlink transmission after reception of the multiple TRP downlink transmission in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115a), a personal digital assistant (PDA), a wearable device (UE 115d), a tablet computer, a laptop computer (UE 115g), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115e and UE 115f), meters (UE 115b and UE 115c), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
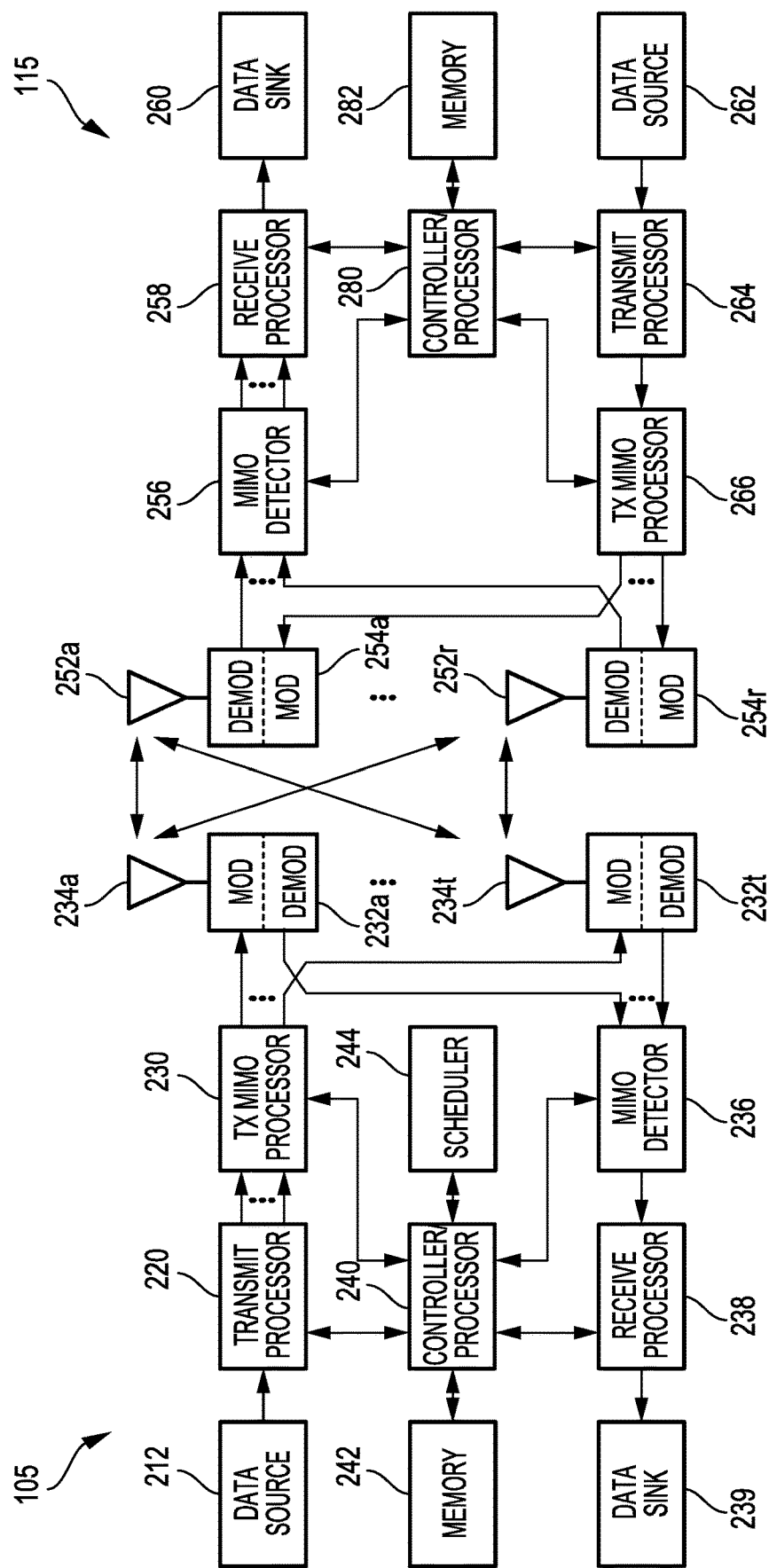
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4A-4C, and/or other processes for the techniques described herein. The memories 242 and 282 may store data and program codes for the base station 105 and the UE 115, respectively. A scheduler 244 may schedule UEs for data transmission on the downlink and/or uplink.

In general, two signals transmitted from the same antenna port may experience the same radio channel, while these same signals transmitted from two different antenna ports or transmission-reception points (TRPs) may experience different radio conditions. There can be scenarios in which signals transmitted from two different antenna ports or TRPs experience radio channels having common properties. In such cases the antenna ports/TRPs can be characterized as quasi-co-located (QCL). This QCL concept has been introduced to potentially help UEs with various operations, such as channel estimation, frequency offset error estimation, synchronization procedures, and the like. For example, if the UE knows that the radio channels corresponding to two different antenna ports/TRPs are QCL in terms of Doppler shift, then the UE could determine the Doppler shift associated with one antenna port/TRP and apply the result on both antenna ports/TRPs for channel estimation. Using the QCL concept, the UE avoids calculating the Doppler shift for both antenna ports/TRPs separately.

The different properties that may be common across antenna ports/TRPs may include Doppler spread/shift, average delay, delay spread, average gain, and spatial receiver parameters. These properties are referred to as the large-scale properties of the antennas port/TRP. The specific combinations of large-scale properties that may be shared across various antenna ports/TRPs have been grouped into four QCL types. QCL-Type A includes the common properties of Doppler shift, Doppler spread, average delay, and delay spread and has been applied for obtaining channel state information (CSI). QCL-Type B includes Doppler shift and Doppler spread and has also been applied for obtaining CSI. QCL-Type C includes average delay and delay spread and has been applied to obtain various measurement information, such as reference signal receive power (RSRP). QCL-Type D includes the spatial receiver parameter and has been applied to support beamforming.

A TCI state definition consists of a reference to channel state information-reference signal (CSI-RS) resources or a synchronization signal block (SSB) index. Up to 128 TCI states can be configured via radio resource control (RRC) signaling. Up to eight of those configured TCI states may then be activated through a medium access control-control element (MAC-CE) for a physical downlink shared channel (PDSCH). In 3GPP Releases 15/16 (Rels. 15/16), a QCL assumption for PDSCH transmission may be indicated in the scheduling DCI by indicating one or two TCI states from the activated TCI states.

In Rel. 15, the TCI field of the DCI may indicate one TCI state for the scheduled PDSCH, while in Rel. 16, the TCI field of the DCI may indicate one or two TCI states for the scheduled PDSCH. When two TCI states are indicated, it means a multi-TCI state PDSCH. For example, within a spatial division multiplex (SDM) scheme, the multi-TCI state PDSCH may indicate two sets of layers having different TCI states. Within a frequency division multiplex (FDM) scheme, the multi-state PDSCH may indicate two sets of resource blocks (RBs) have different TCI states. Within a time division multiplex (TDM) scheme, the multi-TCI state PDSCH may indicate different symbols or slots of the PDSCH or different repetitions in the time domain having different TCI states. Such schemes may further depend on the RRC configuration and other DCI fields.

Figure 3:
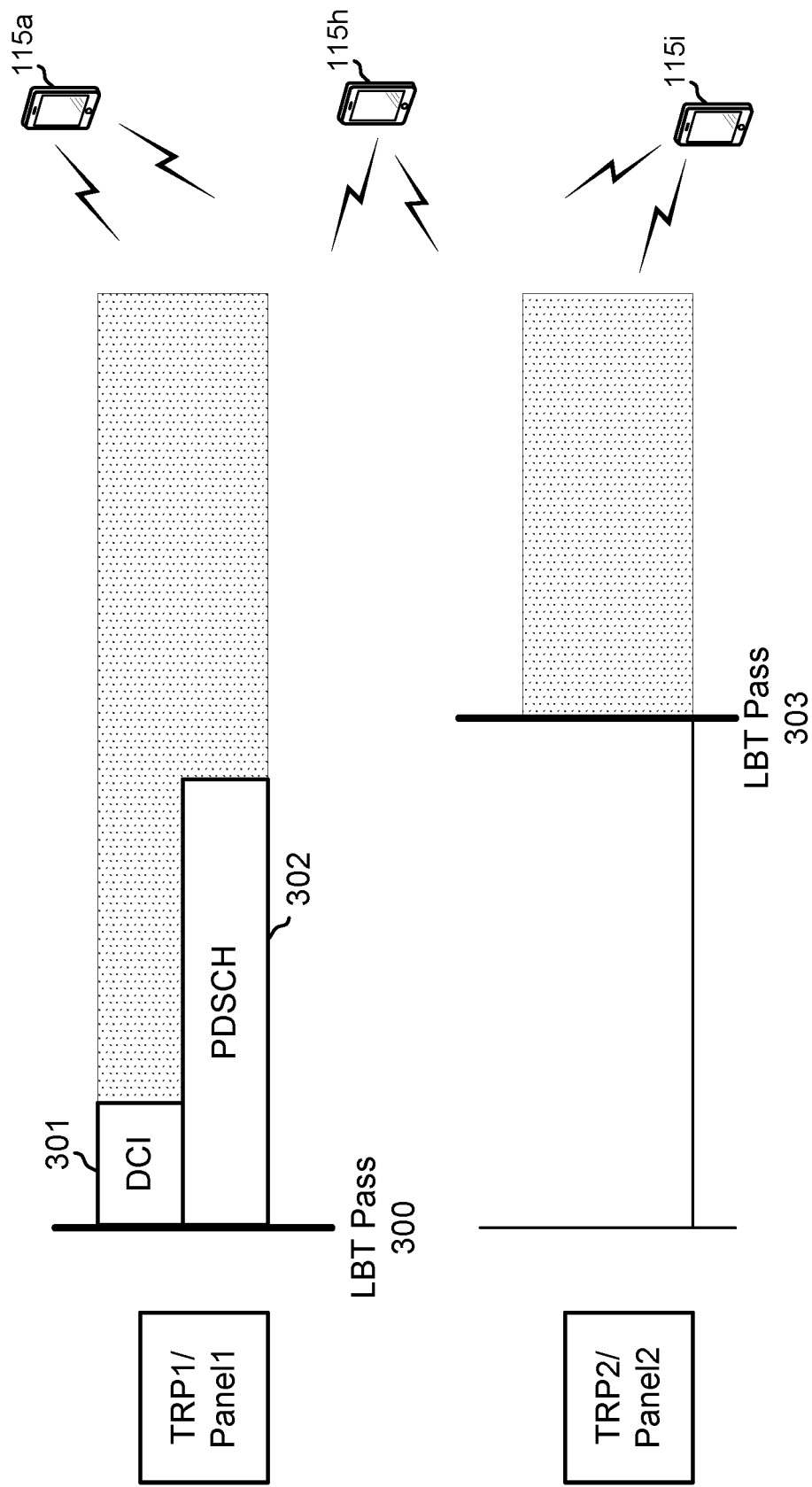
FIG. 3 is a block diagram illustrating two TRP/antenna panels engaged in multi-TRP downlink transmissions to UEs over unlicensed, shared communication spectrum.

FIG. 3 is a block diagram illustrating two TRP/antenna panels, TRP1 and TRP2, engaged in multi-TRP downlink transmissions to UEs 115a, 115h, and 115i over unlicensed, shared communication spectrum. Each of UEs 115a, 115h, and 115i may receive a DCI with a TCI state(s) corresponding to a multi-TRP downlink transmission from both of TRP1 and TRP2. UEs 115a, 115h, and 115i would use the QCL assumption with respect to that TCI state for receiving the downlink transmission. However, when either of TRP1 or TRP2 encounters transmission uncertainty, both TRPs may not transmit for a multi-TRP downlink transmission. For example, TRP1 transmits DCI 301 and PDSCH 302 after detecting the LBT pass at 300. However, TRP2 fails to detect the LBT pass until 303, and cannot participate in the joint transmission of PDSCH 302. Therefore, the actual transmission of PDSCH 302 comes from TRP1 and not from both of TRP1 and TRP2.

When preparing DCI 301, the network may not know in advance the actual TCI state(s) used. That information (LBT pass or not) is known a few microseconds before the joint transmission at a given TRP. Moreover, the LBT result at TRP2 may not be known at TRP1 until after some delay. In the described example of FIG. 3, when considering a single TCI state (Rel. 15), the QCL assumption for PDSCH 302 may be determined from a first TCI state where TRP1 transmits PDSCH 302 by itself; from a second TCI state where TRP2 transmits PDSCH 302 by itself; and a third TCI state where both TRP1 and TRP2 jointly transmit PDSCH 302. The scheduling DCI, DCI 301, indicates the third TCI state. However, because TRP2 could not join the transmission, the actual TCI state would be the first TCI state. This example is relevant in the case of broadcast/multi-cast communications where multiple base stations/TRPs participate in a single frequency network (SFN) area, or a unicast PDSCH with an SFN transmission.

In another example of the aspect illustrated in FIG. 3 using a multi-TCI state (Rel. 16), the scheduling DCI, DCI 301, may indicate first and second TCI states (e.g., under any of SDM, FDM, or TDM schemes). However, because TRP2 could not join the joint transmission, PDSCH 302 has the first TCI state without the set of layers (SDM)/RBs (FDM)/symbols or slots (TDM) corresponding to the second TCI state. This example is relevant in single-DCI based multi-TRP downlink transmissions, where one DCI schedules a multi-TCI state PDSCH, as introduced in Rel. 16. The various aspects of the present disclosure are directed to providing a QCL assumption adjustment in a subsequent time interval after UEs receive the PDSCH in a previous time interval in order to accommodate the actual QCL assumption of the PDSCH in the previous time interval.

Figure 4A:
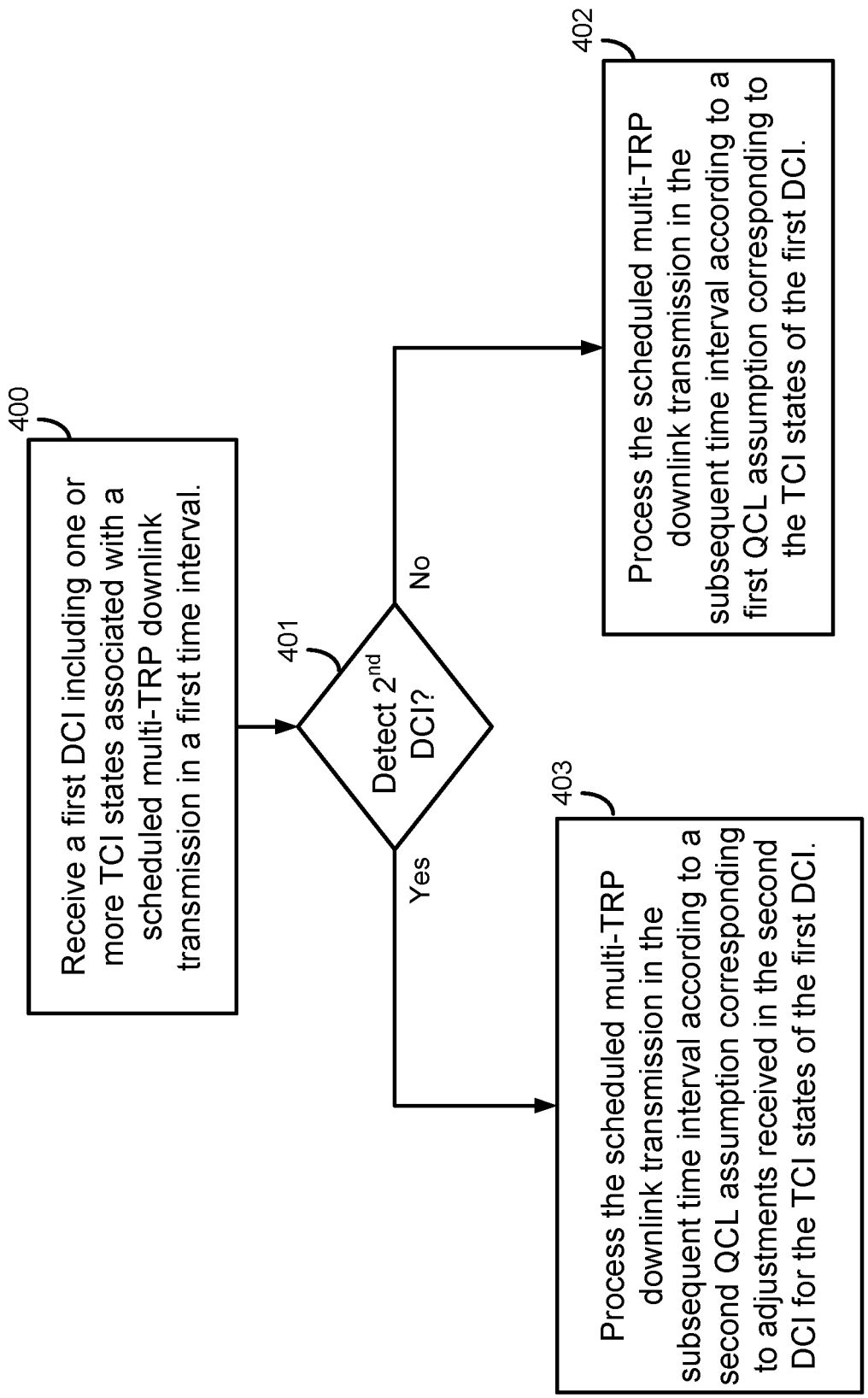
FIGS. 4A-4C are block diagrams illustrating example blocks executed to implement aspects of the present disclosure.
Figure 4B:
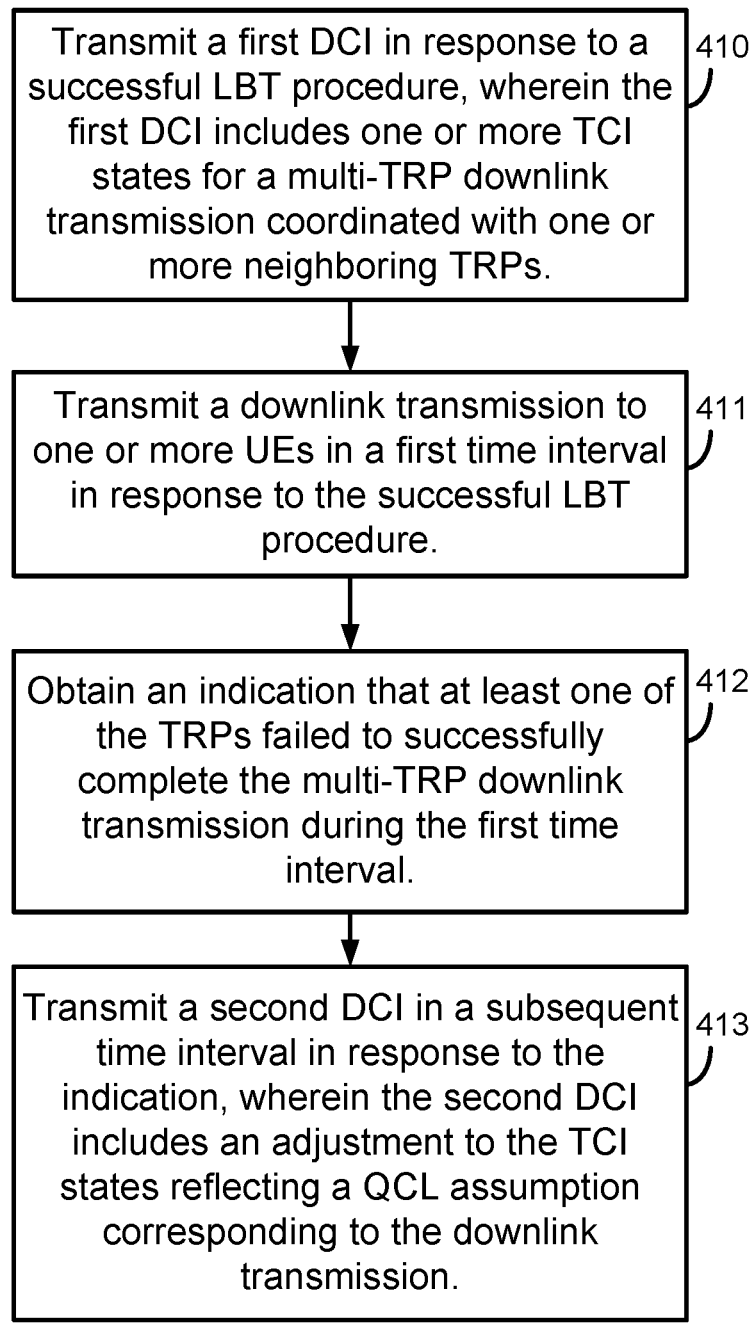
Figure 4C:
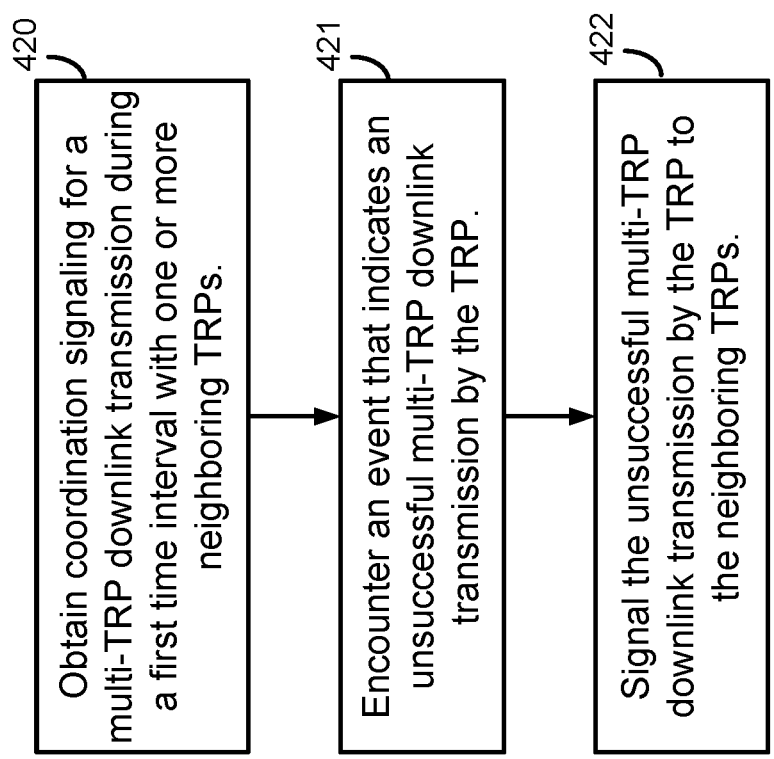
Figure 7:
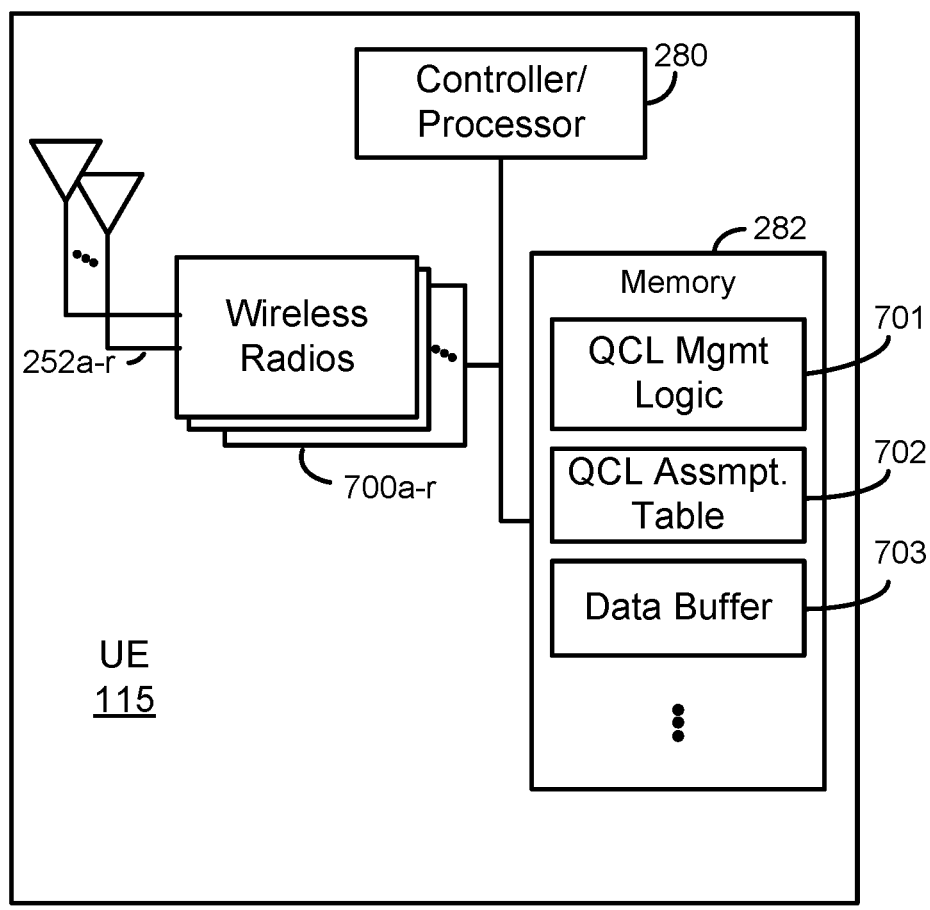
FIG. 7 is a block diagram illustrating a UE configured according to one aspect of the present disclosure.

FIGS. 4A-4C are block diagrams illustrating example blocks executed to implement aspects of the present disclosure. The example blocks of FIG. 4A will also be described with respect to UE 115 as illustrated in FIGS. 2 and 7. FIG. 7 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 700a-r and antennas 252a-r. Wireless radios 700a-r includes various components and hardware, as illustrated in FIG. 2 for UE 115, including modulator/demodulators 254a-r, MIMO detector 256, receive processor 258, transmit processor 264, and TX MIMO processor 266.

Figure 8:
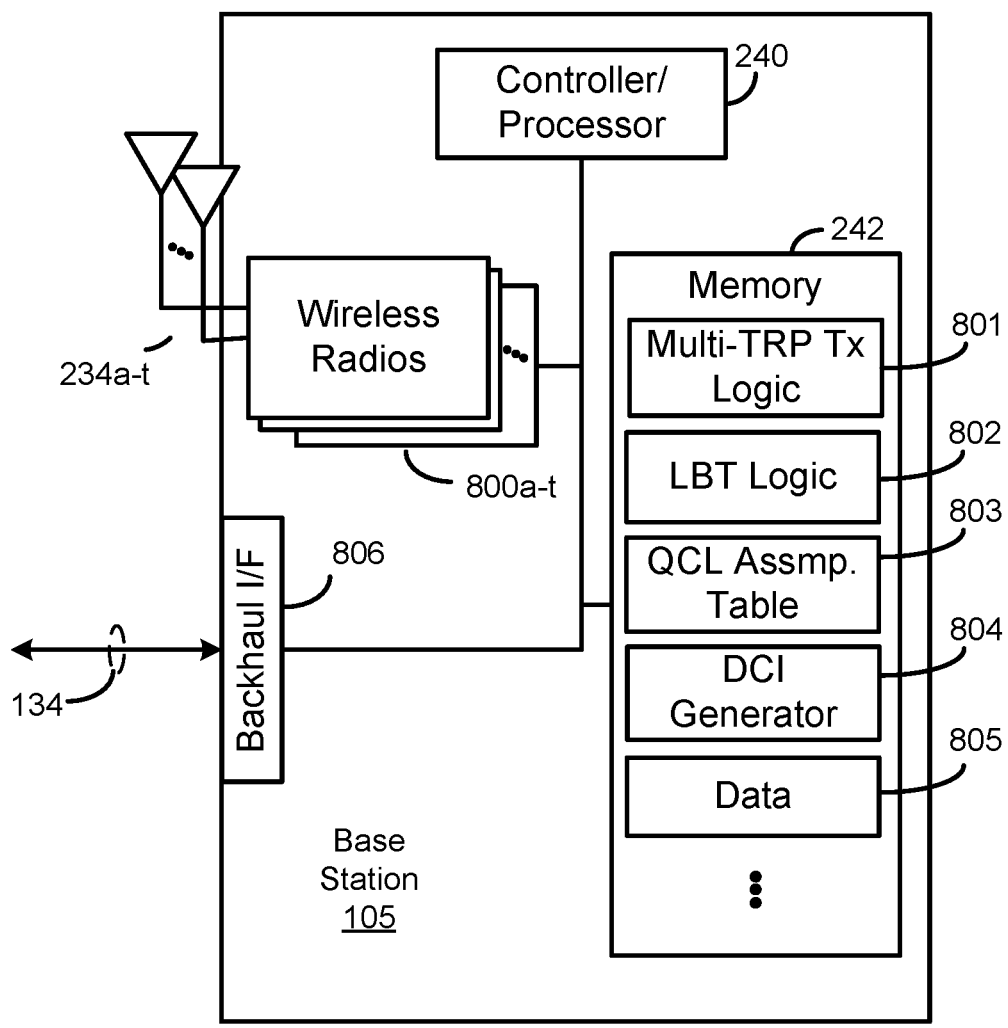
FIG. 8 is a block diagram illustrating a base station configured according to one aspect of the present disclosure.

The example blocks of FIGS. 4B and 4C will also be described with respect to base station 105 as illustrated in FIGS. 2 and 8. FIG. 8 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 800a-t and antennas 234a-t. Wireless radios 800a-t includes various components and hardware, as illustrated in FIG. 2 for base station 105, including modulator/demodulators 232a-t, MIMO detector 236, receive processor 238, transmit processor 220, and TX MIMO processor 230.

According to the aspects described with respect to FIGS. 4A-4C, with communications including multiple TRP transmissions, one of the TRPs of the set of TRPs making up the multiple TRP group may provide the scheduling of the coordinated transmissions for each of the TRPs of the group. This TRP that provides the scheduling and coordination may be referred to herein as the scheduling TRP. The other one or more TRPs of the multiple TRP group, which receive the scheduling and coordination instructions from the scheduling TRP for the coordinated transmissions, may be referred to herein as the non-scheduling TRP. These non-scheduling TRPs may operate, generally, as independent TRPs for other communications, but are a part of the multiple TRP group based on the control signaling for the scheduling and coordination from the scheduling TRP.

At block 420 (FIG. 4C), a non-scheduling TRP may obtain coordination signaling for a multi-TRP downlink transmission during a first time interval with one or more neighboring TRPs. The non-scheduling TRP may obtain such coordination signaling from the network or from the scheduling TRP. A non-scheduling TRP, which may be implemented by a base station, such as base station 105, receives signaling via antennas 234a-t and wireless radios 800a-t. When base station 105 receives signaling coordinating a multiple TRP downlink transmission, base station 105, under control of controller/processor 240, executes multi-TRP transmission logic 801, stored in memory 242. Controller/processor 240 executes the instructions which result in the provision of the functionality of multi-TRP transmission logic 801. Such execution of logic instructions to reveal the functionality is referred to herein as the "execution environment" of such logic.

At block 410 (FIG. 4B), the scheduling TRP transmits a first DCI in response to a successful LBT procedure, wherein the first DCI includes one or more TCI states for a multi-TRP downlink transmission coordinated with one or more neighboring TRPs. The scheduling TRP has coordinated with the other TRPs for the multi-TRP downlink transmission to one or more served UEs. The first DCI includes either a single TCI state (Rel. 15) or one or more TCI states (up to two in Rel. 16) associated with the coordinated multi-TRP downlink transmission. In the case of single TCI state example, the indicated TCI state corresponds to a QCL assumption of a combined (SFNed) transmission from both TRP1 and TRP2. In the case of the multiple TCI state example, the indicated TCI states in the first DCI may correspond to multiple of the TRP jointly transmitting the multi-TRP downlink transmission, where different indicated TCI states corresponds to QCL assumption for different set of layers (SDM scheme), or different set of RBs (FDM scheme), or different set of symbols or slots (TDM scheme). As the scheduling TRP detects success of the LBT procedure, it will then transmit the first DCI to the served UEs.

Further within the execution environment of multi-TRP transmission logic 801, when the successful LBT procedure is detected, base station 105 uses the functionality of DCI generator 804, stored in memory 242, to generate the first DCI. The first DCI includes either a single TCI state (Rel. 15) or one or more TCI states (up to two in Rel. 16) associated with the coordinated multi-TRP downlink transmission. In generating the first DCI, the execution environment of DCI generator 804 references QCL assumption table 803 in memory 242. QCL assumption table 803 provides reference to the TCI states or state identifiers (IDs) that correspond to particular QCL assumptions. The execution environments of both multi-TRP transmission logic 801 and DCI generator 804 will select the appropriate one or more TCI states for the first DCI. In the case of the multiple TCI state example, the available TCI states in the first DCI may correspond to multiple of the TRP jointly transmitting the multi-TRP downlink transmission and another option, such as the multi-TRP downlink transmission including transmissions from base station 105, as the scheduling TRP. As base station 105 detects success of the LBT procedure, it will then transmit the first DCI to the served UEs via wireless radios 800a-t and antennas 234a-t.

At block 400 (FIG. 4A), a UE receives the first DCI including the one or more TCI states associated with the scheduled multi-TRP downlink transmission in the first time interval. The UE, such as UE 115, may receive the first DCI via antennas 252a-r and wireless radios 700a-r either independently transmitted by the scheduling TRP or jointly transmitted by two or more of the neighboring TRPs coordinated for the multi-TRP downlink transmission. In obtaining the first DCI which includes the scheduling of the downlink transmissions in the first time interval, UE 115, under control of controller/processor 280, executes QCL management logic 701. The execution environment of QCL management logic 701 provide UE 115 with the functionality to interpret various TCI states with their corresponding QCL assumptions for processing the downlink transmissions. Upon receiving the first DCI, within the execution environment of QCL management logic 701, UE 115 determines the one or more TCI states will be associated with the scheduled multi-TRP downlink transmission.

At block 411 (FIG. 4B), the scheduling TRP transmits a downlink transmission to the one or more served UEs in the first time interval in response to the successful LBT procedure. As referenced above, the TRPs coordinated for the multi-TRP downlink transmission will each perform an LBT procedure for accessing the shared communication spectrum. According to the illustrated example, base station 105, as the scheduling TRP, successfully passes the LBT procedure and transmits first DCI and data from data store 805, in memory 242, in a downlink transmission intended to be a part of the scheduled multi-TRP downlink transmission.

At block 421 (FIG. 4C), the non-scheduling TRP encounters an event that indicates an unsuccessful multi-TRP downlink transmission. When implemented as a base station, such as base station 105, base station 105 may encounter an event that either prohibits base station 105 from transmitting the multi-TRP downlink transmission or prevents the UE from successfully receiving the transmission. The event encountered may include a failed LBT procedure or delay of LBT success until after the period scheduled for the multi-TRP downlink transmission. Thus, in performing an LBT procedure within the execution environment of LBT logic 802, base station 105 may detect failure of the LBT. Additionally, base station 105, as the non-scheduling TRP, may receive interim priority scheduling to transmit data with a higher priority than the data for the multi-TRP downlink transmission. With the higher priority data, base station 105, as the non-scheduling TRP, would change its transmission schedule to transmit the new, higher priority data. Similarly, base station 105 may transmit the data intended for the multi-TRP downlink transmission, but the transmission is blocked either by excessive interference, geographic feature, a large metallic object in motion (e.g., automobile, airplane, train, elevator, etc.), or the like. In each such case, the multi-TRP downlink transmission is not successfully completed.

At block 422 (FIG. 4C), the non-scheduling TRP signals the unsuccessful multi-TRP downlink transmission to the neighboring TRPs, including, at least, the scheduling TRP. The neighboring TRPs that have coordinated for the multi-TRP downlink transmission, including base station 105, as a non-scheduling TRP, may be connected via backhaul 134 with each other. As base station 105, the non-scheduling TRP, discovers the event that indicates the unsuccessful multi-TRP downlink transmission, it will signal, under control of controller/processor 240, the transmission failure at least to the scheduling TRP via backhaul interface 806 and backhaul 134.

At block 412 (FIG. 4B), the scheduling TRP obtains an indication that at least one of the neighboring TRPs filed to successfully complete the multi-TRP downlink transmission during the first time interval. As indicated above, the non-scheduling TRP signals the detected failure of transmission at least to the scheduling TRP, here the scheduling TRP is implemented by base station 105. Base station 105, the scheduling TRP, thus, receives this indication, via backhaul 134 and backhaul interface 806, which informs that the scheduled multi-TRP downlink transmission did not occur as scheduled.

At block 413 (FIG. 4B), the scheduling TRP transmits a second DCI in a subsequent time interval in response to obtaining the indication, wherein the second DCI includes an adjustment to the TCI states of the first DCI that reflect the actual QCL assumption corresponding to the downlink transmission as made by the scheduling TRP. Within the execution environment of multi-TRP transmission logic 801, when base station 105, as the scheduling TRP, finds out that the scheduled multi-TRP downlink transmission did not occur as scheduled, for which the TCI states in the first DCI were specifically selected, it access DCI generator 804 again to generate the second DCI in the subsequent time interval. The execution environments of multi-TRP transmission logic 801 and DCI generator 804 determine the appropriate QCL assumption of the previously-transmitted downlink transmission by accessing QCL assumption table 803, in memory 242. Base station 105, which the execution environments of multi-TRP transmission logic 801 and DCI generator 804 determines adjustments to the TCI states, such that the adjustments to the TCI states reflect how the downlink transmission actually occurred. These adjustments are included in the second DCI generated by DCI generator 804 and transmitted to the UEs via wireless radios 800a-t and antennas 234a-t.

It should be noted that, in alternative aspects of the present disclosure, the second DCI may be transmitted from the non-scheduling TRP directly in the subsequent time interval (such as, in response to the non-scheduling TRP not being able to participate in the joint transmission in the first time interval due to LBT failure while LBT passes in the subsequent time interval) or may be transmitted jointly by all of the coordinated neighboring TRPs.

At block 401 (FIG. 4A), a determination is made by the UE whether it has detected a second DCI in a subsequent time interval. UE 115 will have buffered the samples of the scheduled multi-TRP downlink transmissions received during the first time interval and may store the buffered samples in data buffer 703. Before processing the buffered samples, UE 115 monitors for a second DCI. If no second DCI has been received, then, at block 402 (FIG. 4A), UE 115 processes the scheduled multi-TRP downlink transmission in the subsequent time interval according to a first QCL assumption corresponding to the TCI state(s) included in the first DCI. Thus, if either no second DCI is received or interference or poor channel quality prevented UE 115 from successfully receiving the second DCI, UE 115, within the execution environment of QCL management logic 701, will process the buffered samples of the scheduled multi-TRP downlink transmissions in data buffer 703 according to a first QCL assumption that corresponds to the original TCI states included in the first DCI, where UE 115 determines the first QCL assumption via the QCL assumption table 702, in memory 282. UE 115 uses the original TCI states in the first DCI as an index in QCL assumption table 703 to find the first QCL assumption to apply.

Otherwise, if UE 115 detects a second DCI, then, at block 403 (FIG. 4A), UE 115 processes the scheduled multi-TRP downlink transmission in the subsequent time interval according to a second QCL assumption corresponding to the adjustments received in the second DCI that adjust the TCI states received in the first DCI. As the scheduling TRP knows that the multi-TRP downlink transmission did not occur as scheduled, it sends the adjustments to the TCI states in the second DCI in the subsequent time interval in order to inform UE 115 of the second or adjusted QCL assumption to apply to the downlink transmission that corresponds to the adjustments made to the original TCI states. UE 115 uses the adjustments with QCL assumption table 702 to find the adjusted QCL assumption to use in processing the buffered sample of the multi-TRP downlink transmission in data buffer 703.

Figure 5:
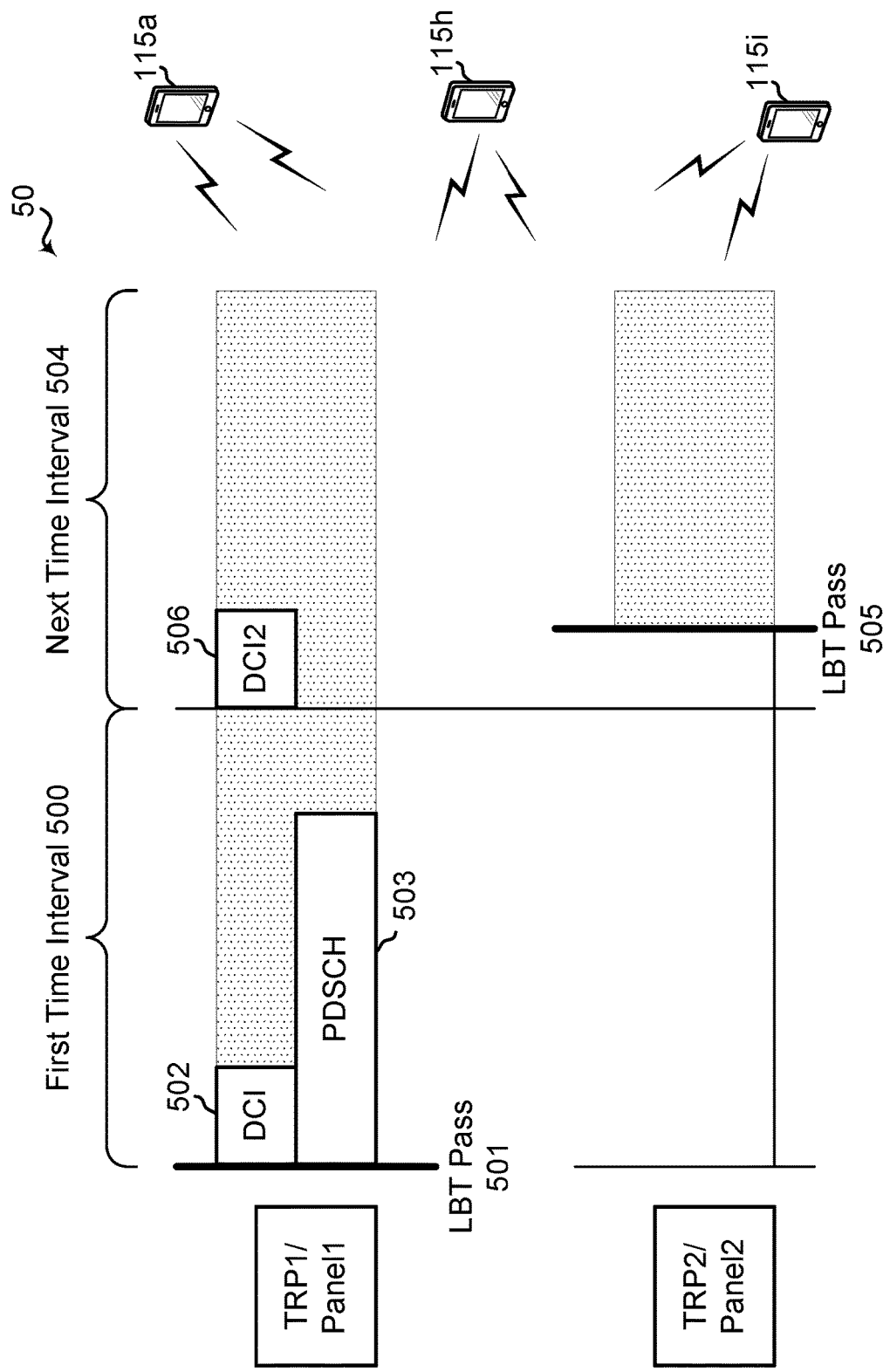
FIG. 5 is a block diagram illustrating two TRPs or antenna panels conducting multi-TRP downlink transmissions according to one aspect of the present disclosure with multiple UEs.

FIG. 5 is a block diagram illustrating two TRPs or antenna panels, TRP1 and TRP2, conducting multi-TRP downlink transmissions according to one aspect of the present disclosure with multiple UEs, UEs 115a, 115h, and 115i. The scheduling TRP, TRP1, coordinates with the non-scheduling TRP, TRP2, to conduct a multi-TRP downlink transmission to the served UEs, UEs 115a, 115h, and 115i. TRP1 and TRP2 schedule to jointly transmit PDSCH 503 within a first time interval 500. TRP1 identifies the one or more TCI states to include in the scheduling DCI, DCI 502, that corresponds to the QCL assumption associated with the joint transmission of PDSCH 503 by TRP1 and TRP2. Alternatively, when more than one TCI state is included, TRP1 may provide an additional possible TCI state that corresponds to another QCL assumption, such as for PDSCH 503 being transmitted solely by TRP.

At 501, TRP1 detects a successful LBT procedure that secures access to the shared communication spectrum for first time interval 500. In response to detecting the successful LBT procedure at 501, TRP1 transmits the scheduling DCI, DCI 502. DCI 502 includes one or more TCI states that correspond to the QCL assumption at least for the joint transmission of PDSCH 503 by TRP1 and TRP2. TRP1 also transmits PDSCH 503 with the intent that it will be part of the multi-TRP downlink transmission with TRP2. However, at 501, TRP2 has not passed its LBT procedure and, thus, cannot begin its transmission. In fact, TRP2 does not detect an LBT pass until 505, within the next time interval 504.

It should be noted that, as referenced above, the transmission interruption experienced by TRP2 can also be attributed to other interrupting events. For example, TRP2 could have experienced a change of scheduling information after the scheduling DCI, DCI 502, has already been transmitted. A change of scheduling may direct TRP2 to send urgent traffic to one of UEs 115a, 115h, or 115i, or even another UE and, therefore, cannot participate in the joint transmission. In another example, TRP2 could experience signal blocking. Even though TRP2 participated in the joint transmission or PDSCH 503, due to transmission blocking (interference, channel quality, blocking geographic feature) its transmission is not received, or is received weakly, by one or more of UEs 115a, 115h, or 115i. TRP2 may discover this transmission blocking information through feedback from UEs 115a, 115h, or 115i after transmission of both DCI 502 and PDSCH 503.

Upon detecting that it has not passed the LBT procedure at 501, TRP2 signals TRP1 that it encountered an event that resulted in an unsuccessful transmission of PDSCH 503 by TRP2. Accordingly, PDSCH 503 has been transmitted solely by TRP1. Upon receipt of this signaling from TRP2, TRP1 determines to transmit a second DCI, DCI2 506 during next time interval 504. DCI2 506 includes adjustments to the TCI states that were included in the scheduling DCI, DCI 502. The adjustments change the TCI states to correspond to a QCL assumption that reflects the transmission of PDSCH 503 solely by TRP1. For example, the adjustments within DCI2 506 may provide another TCI state ID or set of TCI state IDs associated with the transmitted PDSCH 503. Alternatively, the adjustments within DCI2 506 may provide an indication of which of the TCI states identified in the first DCI, DCI 502, either are to be used or that should not be used. For example, if DCI 502 includes two TCI states in which one TCI state corresponded to a first QCL assumption for PDSCH 503 being jointly transmitted by TRP1 and TRP2 and the other TCI state corresponded to a second QCL assumption for PDSCH 503 being transmitted solely by TRP1, then the adjustment included in DCI2 506 may indicate to UEs 115a, 115h, and 115i either to use the second QCL assumption or that the first QCL assumption is not used.

In a further alternative, DCI2 506 may include a bitmap indicating whether each TRP in the set of TRPs transmitted or not. Based on the TRPs indicated to have transmitted, UEs 115*a*, 115*h*, and 115*i* may derive the QCL assumption or the TCI state based on a predetermined mapping from the TCI state identified in DCI 502.

UEs 115*a*, 115*h*, and 115*i* may buffer the samples of the scheduled multi-TRP downlink transmission of PDSCH 503 for the duration of first time interval 500 and not begin processing until it determines whether or not a second DCI, DCI2 506 has been received. If received, UEs 115*a*, 115*h*, and 115*i* will receive the scheduled multi-TRP downlink transmission of PDSCH 503 using the QCL assumption corresponding to the TCI states identified in DCI 502. Otherwise, if the second DCI, DCI2 506 has not been received (either because it was not sent or because UEs 115*a*, 115*h*, or 115*i* could not successfully receive DCI2 506), UEs 115*a*, 115*h*, and 115*i* would process the samples of the multi-TRP downlink transmission of PDCSH 503 using the second QCL assumption corresponding to the adjusted TCI states identified in the second DCI, DCI2 506.

As such, according to the various aspect of the present disclosure, a QCL assumption indication can be provided after reception of the downlink transmission. Another DCI can be transmitted by the TRP, whether solely by TRP1 or solely by TRP2, or jointly by TRP1 and TRP2, and received by UEs 115*a*, 115*h*, and 115*i* during next time interval 504 to indicate the actual QCL assumption of one or more downlink transmissions received in first time interval 500.

It should be noted that the time intervals, whether a first time interval, a next time interval, or a subsequent time interval, may include a slot, channel occupancy time (COT), related to the successful LBT procedure, or the like. The TRP transmitting the second DCI, DCI2 506 can identify the periodicity of the search space set during which UEs 115*a*, 115*h*, and 115*i* may monitor for the second DCI. The TRP transmitting the second DCI, DCI2 506 can then transmit DCI2 506 during that search space set.

It should further be noted that the second DCI, DCI2 506 can be configured as a group common DCI with a specific radio network temporary identifier (RNTI) targeted toward a group of UEs, or can be a UE-specific DCI.

Figure 6A:
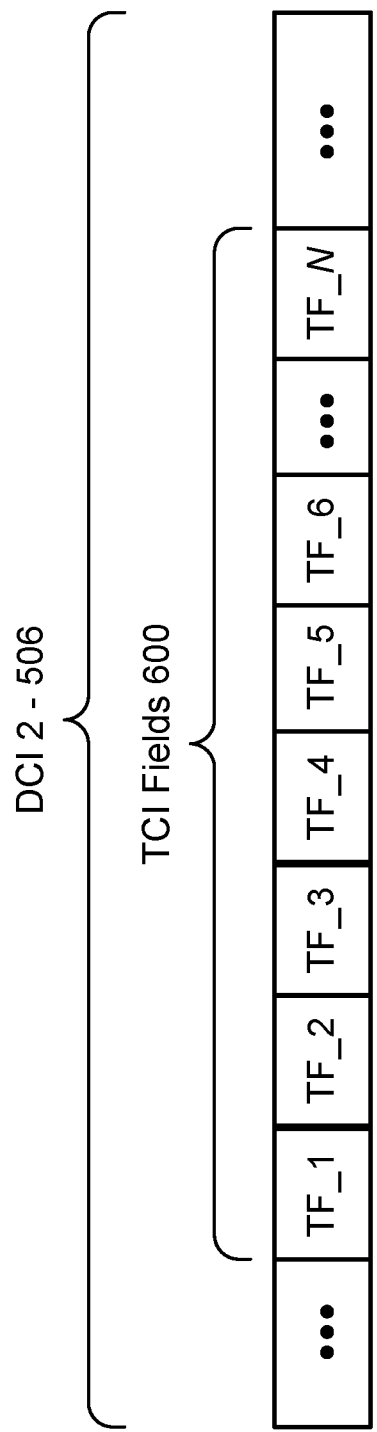
FIG. 6A is a block diagram illustrating a detail of a second DCI configured according to one aspect of the present disclosure as depicted in FIG. 5.

FIG. 6A is a block diagram illustrating a detail of DCI2 506 configured according to one aspect of the present disclosure as depicted in FIG. 5. The second DCI, DCI2 506 may include more than just a single adjustment to the one or more TCI states provided in the first DCI. For example, DCI2 506 may be configured to have multiple TCI fields 600. Thus, the second DCI, DCI2 506, may include more adjusted TCI state information than in the first DCI in order to accommodate adjustments for multiple different downlink transmissions that may have been sent during the first time interval to one or more UEs. The second DCI, DCI2 506, provides adjustments for all downlink transmissions during the first time interval, which may have been scheduled by separately individual first DCIs. When second DCI, DCI2 506, is group-common, the multiple downlink transmissions in the first time interval, for which the second DCI, DCI2 506, provides QCL assumption adjustments, can correspond to multiple UEs. As illustrated in FIG. 6A, DCI2 506 includes N TCI fields, TF_1-TF_N. Each of TF_1-TF_N can provide an adjustment of TCI states or TCI state IDs for multiple downlink transmissions from the first time interval. Such second DCI, DCI2 506, may be received in different component carriers (CCs) or multiple LBT bandwidths, depending on the scheme operating (e.g., SDM, FDM, TDM, etc.). Thus, a different set of TCI states may be included within TCI fields 600 to accommodate the QCL relationships of TRPs that have transmitted different downlink transmissions over first time interval 500.

Figure 6B:
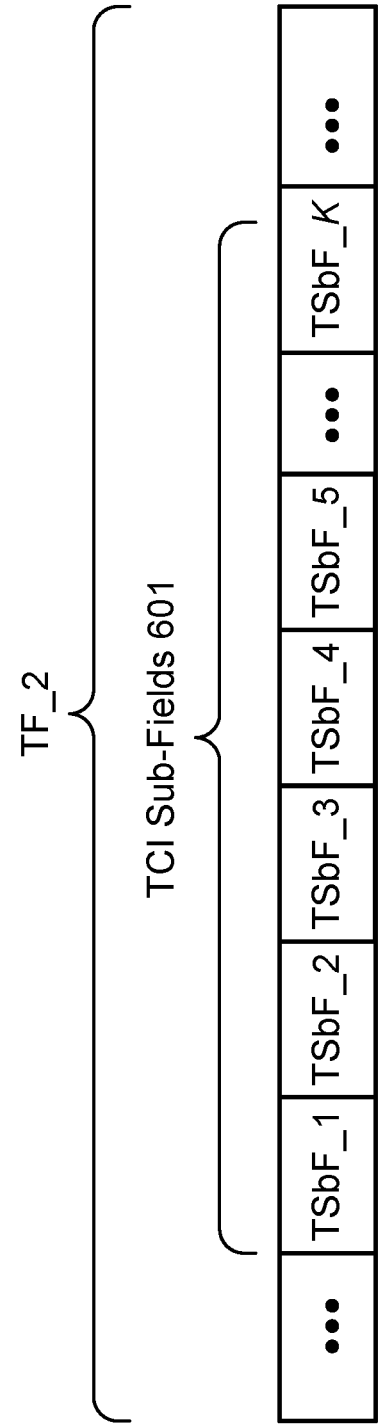
FIG. 6B is a block diagram illustrating a detail of TCI field, as configured according to one aspect of the present disclosure, within the TCI fields of a second DCI.

FIG. 6B is a block diagram illustrating a detail of TF_2, as configured according to one aspect of the present disclosure, within TCI fields 600 of DCI2 506. In addition to DCI2 506 including TCI fields 600 with multiple fields with independent TCI state adjustments for different CCs, LBT bandwidths, and the like, each TCI field, such as TF_2, may include multiple TCI sub-fields, such as TCI sub-fields 602. TCI sub-fields include sub-fields, TSbF_1-TSbF_K. Such further division of TCI adjustment information may provide for a more granular adjustment, such as different TCI adjustments for the different downlink transmissions that occurred during first time interval 500.

As noted above, each TCI field, TF_1-TF_N (FIG. 6A), or TCI sub-field, TSbF_1-TSbF_K may include adjustments in various forms. In a first example form, an adjustment for TCI fields 600 or TCI sub-fields 601, may include a new TCI state ID or multiple TCI state IDs for the received, scheduled multi-TRP downlink transmission (e.g., PDSCH 503 (FIG. 5)). A second example form of adjustment may include an indication of which TCI state identified in the first DCI either is not used or is, in fact, used. Thus, when the first DCI includes multiple TCI states, the adjustment of the second example form would instruct the associated UEs (e.g., UEs 115*a*, 115*h*, and 115*i*) which of the identified TCI states from the first DCI to use or to not use in processing the received samples of the scheduled multi-TRP downlink transmissions.

A third example form of adjustment may include a bitmap indicating whether each TRP in a set of TRPs either did or did not transmit. Based on the identified TRPs that joined the multi-TRP downlink transmission, a served UE (e.g., UEs 115*a*, 115*h*, and 115*i*) can derive the QCL assumption or TCI state based on a preconfigured mapping from the TCI states identified in the first DCI.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4A-4C may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. For example, a first aspect of wireless communication, includes receiving, by a UE, a first DCI including one or more TCI states, wherein the one or more TCI states are associated with a scheduled multi-TRP downlink transmission in a first time interval, monitoring, by the UE, for a second DCI in a subsequent time interval, wherein the second DCI includes an adjustment to the one or more TCI states of the first DCI, and in response to detection of the second DCI, processing, by the UE, the scheduled multi-TRP downlink transmission in the subsequent time interval according to a second QCL assumption corresponding to the adjustment to the one or more TCI states.

A second aspect, based on the first aspect, further including storing, by the UE, buffered samples of the scheduled multi-TRP downlink transmission received from one or more TRPs in the first time interval.

A third aspect, based on the first aspect, further including, in response to a failure to detect the second DCI, processing, by the UE, the scheduled multi-TRP downlink transmission in the subsequent time interval according to a first QCL assumption corresponding to the one or more TCI states of the first DCI.

A fourth aspect, based on the first aspect, wherein the first and second time intervals include one of: a slot; or a channel occupancy time (COT) associated with success of a channel sensing procedure.

A fifth aspect, based on the first aspect, wherein the second DCI is received according to one of: a group common DCI configuration for a group of UEs including the UE; or a UE-specific DCI configured for the UE.

A sixth aspect, based on the first aspect, wherein the second DCI includes a plurality of TCI fields with, wherein each TCI field of the plurality of TCI fields corresponds to one of: a component carrier or a LBT bandwidth, and identifies the adjustment associated with the one of: the component carrier or the LBT bandwidth.

A seventh aspect, based on the sixth aspect, wherein each TCI field includes a plurality of sub-fields identifying the adjustment associated with one of: a set of symbols or a slot within the first time interval.

An eighth aspect, based on the seventh aspect, wherein the adjustment within the second DCI includes one of: one or more updated TCI states identifying the second QCL assumption; an identification of one or more unused TCI states of the one or more TCI states of the first DCI not used for the second QCL assumption of the candidate downlink transmission; or a bitmap indicating a transmission success state for each TRP of the one or more TRPs with regard to the multi-TRP transmission, wherein the UE determines the second QCL assumption based on the one or more transmitting TRPs of the one or more TRPs that transmitted the candidate downlink transmissions.

A ninth aspect, based on the first aspect, wherein the first and second DCIs are received by the UE one of: independently from one TRP, or jointly from two or more TRP.

A tenth aspect, based on the first aspect, further including determining, by the UE, an unsuccessful receipt of a subset of candidate downlink transmissions of the candidate downlink transmissions from one or more blocked TRPs of the one or more TRPs, wherein the unsuccessful receipt includes one of: a failure to receive the subset of candidate downlink transmissions, or an incapability of the TRP to successfully receive the subset of candidate downlink transmissions based on a signal quality of the subset of candidate downlink transmissions; and transmitting, by the UE, feedback to the one or more blocked TRPs, wherein the feedback indicates the unsuccessful receipt of the subset of candidate downlink transmissions.

An eleventh aspect including any combination of the first through the tenth aspects.

A twelfth aspect of wireless communication includes transmitting, by a TRP in response to a successful LBT procedure, a first DCI including one or more TCI states for a multi-TRP downlink transmission coordinated with one or more neighboring TRPs via shared communication spectrum; transmitting, by the TRP, a downlink transmission to one or more UEs in a first time interval in response to the successful LBT procedure on the shared communication spectrum, wherein the downlink transmission is intended for the multi-TRP downlink transmission; obtaining, by the TRP, an indication that at least one TRP of the one or more neighboring TRPs failed to successfully complete the multi-TRP downlink transmission during the first time interval; and transmitting, by the TRP, a second DCI in a subsequent time interval in response to the indication, wherein the second DCI includes an adjustment for the one or more TCI states reflecting a QCL assumption corresponding to the downlink transmission.

A thirteenth aspect, based on the twelfth aspect, wherein the first and second time intervals include one of: a slot; or a COT associated with success of a channel sensing procedure, including the successful LBT procedure.

A fourteenth aspect, based on the twelfth aspect, further including identifying, by the TRP, for a periodicity of search space configured for the one or more UEs; and determining, by the TRP, the second time interval within a search space after the first time interval in accordance with the periodicity.

A fifteenth aspect, based on the twelfth aspect, wherein the second DCI is configured according to one of: a group common DCI configured for a group of UEs including the one or more UEs; or a UE-specific DCI configured for an identified UE of the one or more UEs.

A sixteenth aspect, based on the twelfth aspect, wherein the second DCI includes a plurality of TCI fields with, wherein each TCI field of the plurality of TCI fields corresponds to one of: a component carrier or a LBT bandwidth, and identifies the adjustment associated with the one of: the component carrier or the LBT bandwidth.

A seventeenth aspect, based on the sixteenth aspect, wherein each TCI field includes a plurality of sub-fields identifying the adjustment associated with one of: a set of symbols or a slot within the first time interval.

An eighteenth aspect, based on the seventeenth aspect, wherein the adjustment within the second DCI includes one of: one or more updated TCI states identifying the QCL assumption; an identification of one or more unused TCI states of the one or more TCI states of the first DCI not used for the QCL assumption of the downlink transmission; or a bitmap indicating a transmission success state for each TRP of the TRP and the one or more neighboring TRPs with regard to the multi-TRP downlink transmission.

A nineteenth aspect, based on the twelfth aspect, wherein the indication identifies the failure of the at least one TRP to successfully complete the multi-TRP downlink transmission is associated with one of: failure to pass an LBT procedure by the multi-TRP downlink transmission coordinated with the one or more neighboring TRPs; a change of transmission scheduling received by the at least one TRP; or a blocked transmission of the at least one TRP.

A twentieth aspect including any combination of the twelfth through the nineteenth aspects.

A twenty-first aspect of wireless communication includes obtaining, by a TRP, coordination signaling for a multi-TRP downlink transmission during a first time interval with one or more neighboring TRPs over a shared communication spectrum, encountering, by the TRP, an event that indicates an unsuccessful multi-TRP downlink transmission by the TRP; and signaling, by the TRP, the unsuccessful multi-TRP downlink transmission by the TRP to the one or more neighboring TRPs.

A twenty-second aspect, based on the twenty-first aspect, wherein the event indicating the unsuccessful multi-TRP downlink transmission includes one of: a failure of the TRP to pass a listen before talk (LBT) procedure on the shared communication spectrum; receipt of a change of transmission scheduling for the first time interval; or detection of a blocked downlink transmission, wherein the blocked downlink transmission was intended for the multi-TRP downlink transmission.

A twenty-third aspect, based on the twenty-second aspect, further including transmitting, by the TRP, a downlink transmission to one or more UEs on the shared communication spectrum intended for the multi-TRP downlink transmission; receiving, by the TRP, feedback from the one or more UEs indicating unsuccessful receipt of the downlink transmission; and determining, by the TRP, that the event is the blocked downlink transmission based on the feedback from the one or more UEs.

A twenty-fourth aspect, based on the twenty-first aspect, further including transmitting, by TRP, a first DCI including one or more TCI states for the multi-TRP downlink transmission coordinated with one or more neighboring TRPs, wherein the transmitting is performed one of: independently by the TRP, or jointly by the TRP and at least one TRP of the one or more neighboring TRPs.

A twenty-fifth aspect, based on the twenty-first aspect, further including transmitting, by the TRP, a second DCI in a subsequent time interval on the shared communication spectrum in response to the event, wherein the second DCI includes an adjustment for one or more TCI states transmitted in a first DCI during the first time interval, wherein the adjustment reflects a QCL assumption corresponding to one or more downlink transmissions of the multi-TRP downlink transmission transmitted by at least one transmitting TRP of the one or more neighboring TRPs, wherein the transmitting is performed one of: independently by the TRP, or jointly by the TRP and at least one TRP of the one or more neighboring TRPs.

A twenty-sixth aspect, based on the twenty-first aspect, wherein the first time intervals includes one of: a slot; or a COT associated with success of a channel sensing procedure.

A twenty-seventh aspect including any combination of the twenty-first through the twenty-sixth aspects.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed at a user equipment (UE), the method comprising:
   receiving a first downlink control information (DCI) including one or more transmission configuration indicator (TCI) states, wherein the one or more TCI states are associated with a scheduled multi-transmission-reception point (TRP) downlink transmission in a first time interval;
   monitoring for a second DCI in a second time interval that is subsequent to the first time interval, wherein the second DCI includes an adjustment to the one or more TCI states of the first DCI; and
   in response to detection of the second DCI, processing the scheduled multi-TRP downlink transmission in the second time interval according to a first quasi-colocation (QCL) assumption corresponding to the adjustment to the one or more TCI states.

2. The method of claim 1, further including:
   receiving, from one or more transmission reception points (TRPs) in the first time interval, buffered samples of the scheduled multi-TRP downlink transmission;
   storing the buffered samples of the scheduled multi-TRP downlink transmission.

3. The method of claim 1, further including, in response to a failure to detect the second DCI, processing the scheduled multi-TRP downlink transmission in the second time interval according to a second QCL assumption corresponding to the one or more TCI states of the first DCI.

4. The method of claim 1, wherein the first and second time intervals include one of:
   a slot; or
   a channel occupancy time (COT) associated with success of a channel sensing procedure.

5. The method of claim 1, wherein the second DCI is received according to one of:
   a group common DCI configuration for a group of UEs including the UE; or
   a UE-specific DCI configured for the UE.

6. The method of claim 1, wherein the second DCI includes a plurality of TCI fields, wherein each TCI field of the plurality of TCI fields corresponds to a component carrier or a listen before talk (LBT) bandwidth and identifies the adjustment associated with a corresponding component carrier or the LBT bandwidth of the one or more TCI states of the first DCI.

7. The method of claim 6, wherein each TCI field includes a plurality of sub-fields identifying the adjustment associated with a set of symbols or a slot within the first time interval and associated with the first DCI.

8. The method of claim 7, wherein the adjustment within the second DCI includes one of:
   one or more updated TCI states identifying the first QCL assumption;
   an identification of one or more unused TCI states of the one or more TCI states of the first DCI not used for the first QCL assumption of a candidate downlink transmission; or
   a bitmap indicating a transmission success state for each TRP of one or more TRPs associated with the multi-TRP downlink transmission,
   the first QCL assumption being based on one or more transmitting TRPs of the one or more TRPs that transmitted the candidate downlink transmission.

9. The method of claim 1, further comprising:
   receiving a second DCI, wherein the first DCI and the second DCI are independently received from one TRP or jointly received from two or more TRPs.

10. The method of claim 1, further including:
    transmitting feedback to one or more blocked TRPs of the one or more TRPs, wherein the feedback indicates unsuccessful receipt of a subset of candidate downlink transmissions,
    and further wherein the unsuccessful receipt includes:
    a failure to receive the subset of candidate downlink transmissions, or
    an incapability of the TRP to successfully receive the subset of candidate downlink transmissions based on a signal quality of the subset of candidate downlink transmissions.

11. A method of wireless communication performed at a transmission-reception point (TRP), the method comprising:
    transmitting, in response to a successful listen before talk (LBT) procedure, a first downlink control information (DCI) including one or more transmission configuration indicator (TCI) states for a multi-TRP downlink transmission coordinated with one or more neighboring TRPs via shared communication spectrum;
    transmitting a downlink transmission to one or more user equipment (UEs) in a first time interval in response to the successful listen before talk (LBT) procedure on the shared communication spectrum, wherein the downlink transmission is configured for the multi-TRP downlink transmission;
    obtaining an indication that at least one TRP of the one or more neighboring TRPs failed to successfully complete the multi-TRP downlink transmission during the first time interval; and
    transmitting a second DCI in a second time interval subsequent to the first time interval in response to the indication, wherein the second DCI includes an adjustment for the one or more TCI states reflecting a quasi-colocation (QCL) assumption corresponding to the downlink transmission.

12. The method of claim 11, wherein the first and second time intervals include one of:
    a slot; or
    a channel occupancy time (COT) associated with success of a channel sensing procedure, including the successful LBT procedure.

13. The method of claim 11, further including:
    identifying for a periodicity of search space configured for the one or more UEs, wherein:
    the second time interval is within a search space after the first time interval and is based on the periodicity.

14. The method of claim 11, wherein the second DCI is configured according to one of:
    a group common DCI configured for a group of UEs including the one or more UEs; or
    a UE-specific DCI configured for an identified UE of the one or more UEs.

15. The method of claim 11, wherein the second DCI includes a plurality of TCI fields, wherein each TCI field of the plurality of TCI fields corresponds to a component carrier or a listen before talk (LBT) bandwidth, and identifies the adjustment associated with the component carrier or the LBT bandwidth.

16. The method of claim 15, wherein each TCI field includes a plurality of sub-fields identifying the adjustment associated with a set of symbols or a slot within the first time interval.

17. The method of claim 16, wherein the adjustment within the second DCI includes one of:
one or more updated TCI states identifying the QCL assumption;
an identification of one or more unused TCI states of the one or more TCI states of the first DCI not used for the QCL assumption of the downlink transmission; or
a bitmap indicating a transmission success state for each TRP of the TRP and the one or more neighboring TRPs of the multi-TRP downlink transmission.

18. The method of claim 11, wherein the indication identifies failure of the at least one TRP to successfully complete the multi-TRP downlink transmission is associated with one of:
failure to pass an LBT procedure by the multi-TRP downlink transmission coordinated with the one or more neighboring TRPs;
a change of transmission scheduling received by the at least one TRP; or
a blocked transmission of the at least one TRP.

19. A method of wireless communication performed at a transmission-reception point (TRP), the method comprising:
obtaining coordinating signaling for a multi-TRP downlink transmission during a first time interval with one or more neighboring TRPs over a shared communication spectrum;
encountering an event that indicates an unsuccessful multi-TRP downlink transmission; and
signaling the unsuccessful multi-TRP downlink transmission to the one or more neighboring TRPs.

20. The method of claim 19, wherein the event indicating the unsuccessful multi-TRP downlink transmission includes one of:
a failure of the TRP to pass a listen before talk (LBT) procedure on the shared communication spectrum;
a receipt of a change of transmission scheduling for the first time interval; or
a detection of a blocked downlink transmission, wherein the blocked downlink transmission was configured for the multi-TRP downlink transmission.

21. The method of claim 20, further including:
transmitting a downlink transmission to one or more user equipment (UEs) on the shared communication spectrum, the downlink transmission configured for the multi-TRP downlink transmission;
receiving feedback from the one or more UEs indicating unsuccessful receipt of the downlink transmission,
wherein the feedback is indicative of the blocked downlink transmission.

22. The method of claim 19, further including:
transmitting a first downlink control information (DCI) including one or more transmission configuration indicator (TCI) states for the multi-TRP downlink transmission coordinated with one or more neighboring TRPs, wherein the transmitting is performed one of: independently, or jointly with at least one TRP of the one or more neighboring TRPs.

23. The method of claim 19, further including:
transmitting a second DCI in a second time interval subsequent to the first time interval on the shared communication spectrum in response to the event, wherein the second DCI includes an adjustment for one or more TCI states transmitted in a first DCI during the first time interval, wherein the adjustment reflects a quasi-colocation (QCL) assumption corresponding to one or more downlink transmissions of the multi-TRP downlink transmission transmitted by at least one transmitting TRP of the one or more neighboring TRPs, wherein the transmitting is performed one of: independently, or jointly with at least one TRP of the one or more neighboring TRPs.

24. The method of claim 19, wherein the first time intervals includes one of:
a slot; or
a channel occupancy time (COT) associated with success of a channel sensing procedure.

25. An apparatus for wireless communication, the UE comprising:
at least one processor; and
a memory comprising instructions,
wherein the at least one processor is configured to execute instructions and cause the apparatus to:
receive a first downlink control information (DCI) including one or more transmission configuration indicator (TCI) states, wherein the one or more TCI states are associated with a scheduled multi-transmission-reception point (TRP) downlink transmission in a first time interval;
monitor for a second DCI in a second time interval that is subsequent to the first time interval, wherein the second DCI includes an adjustment to the one or more TCI states of the first DCI; and
process in response to detection of the second DCI, the scheduled multi-TRP downlink transmission in the second time interval according to a first quasi-colocation (QCL) assumption corresponding to the adjustment to the one or more TCI states.

26. The apparatus of claim 25, further including configuration of the at least one processor to:
receive, from one or more transmission reception points (TRPs) in the first time interval, buffered samples of the scheduled multi-TRP downlink transmission;
store the buffered samples of the scheduled multi-TRP downlink.

27. The apparatus of claim 25, further including configuration of the at least one processor to process in response to a failure to detect the second DCI, the scheduled multi-TRP downlink transmission in the second time interval according to a second QCL assumption corresponding to the one or more TCI states of the first DCI.

28. The apparatus of claim 25, wherein the second DCI is received according to one of:
a group common DCI configuration for a group of UEs including the UE; or
a UE-specific DCI configured for the UE.

29. The apparatus of claim 25, wherein the second DCI includes a plurality of TCI fields, wherein each TCI field of the plurality of TCI fields corresponds to one of: a component carrier or a listen before talk (LBT) bandwidth, and identifies the adjustment associated with the one of: the component carrier or the LBT bandwidth.

30. The apparatus of claim 25, further comprising a transceiver via which the apparatus monitors for the second DCI, wherein the apparatus is configured as a UE.

* * * * *